Aug. 2, 1955  J. C. F. MALTHANER  2,714,388
AUTOMATIC WATER DISTRIBUTORS
Filed Jan. 4, 1950  5 Sheets-Sheet 1
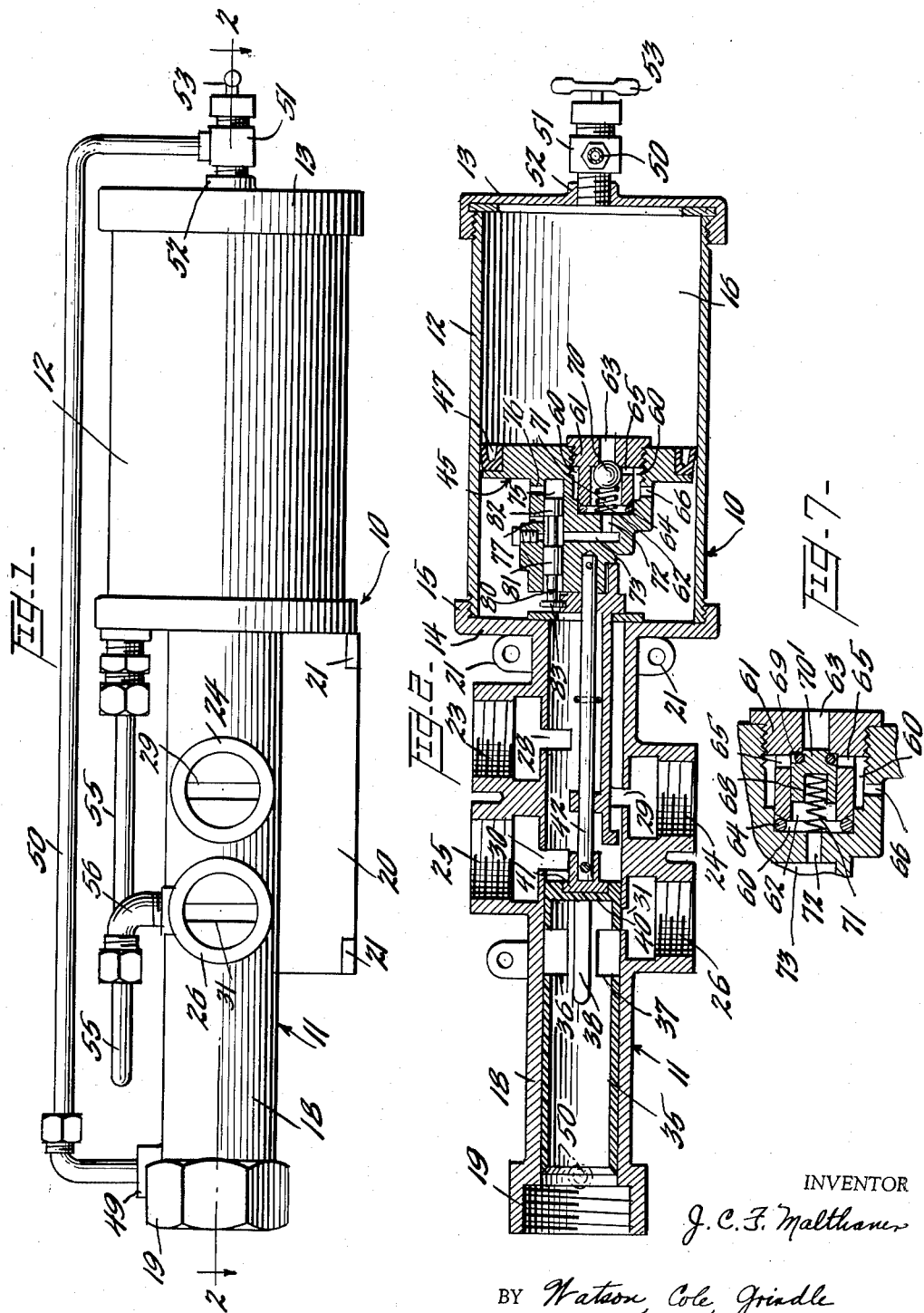
INVENTOR
J. C. F. Malthaner
BY Watson, Cole, Grindle
& Watson  ATTORNEYS

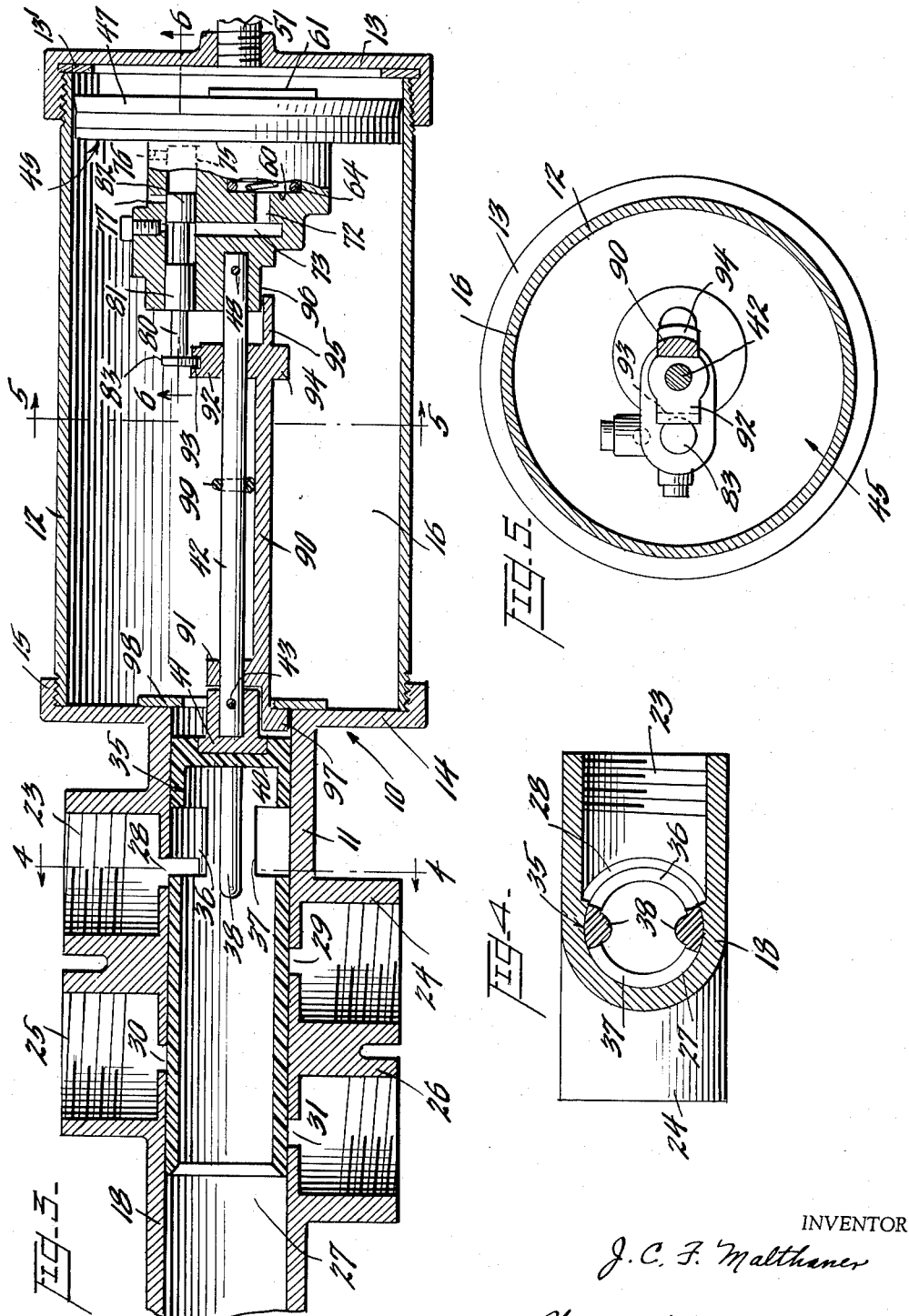

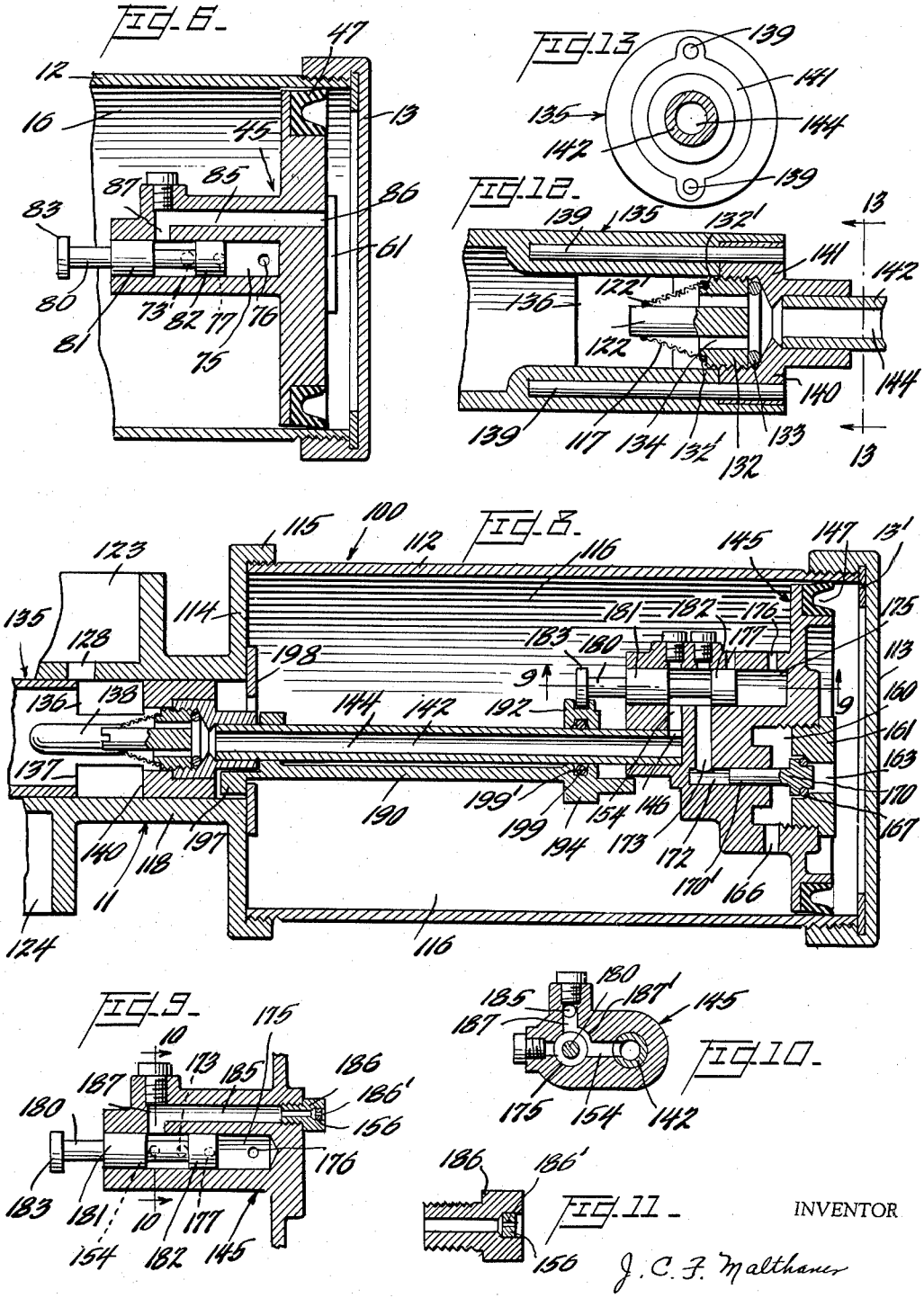

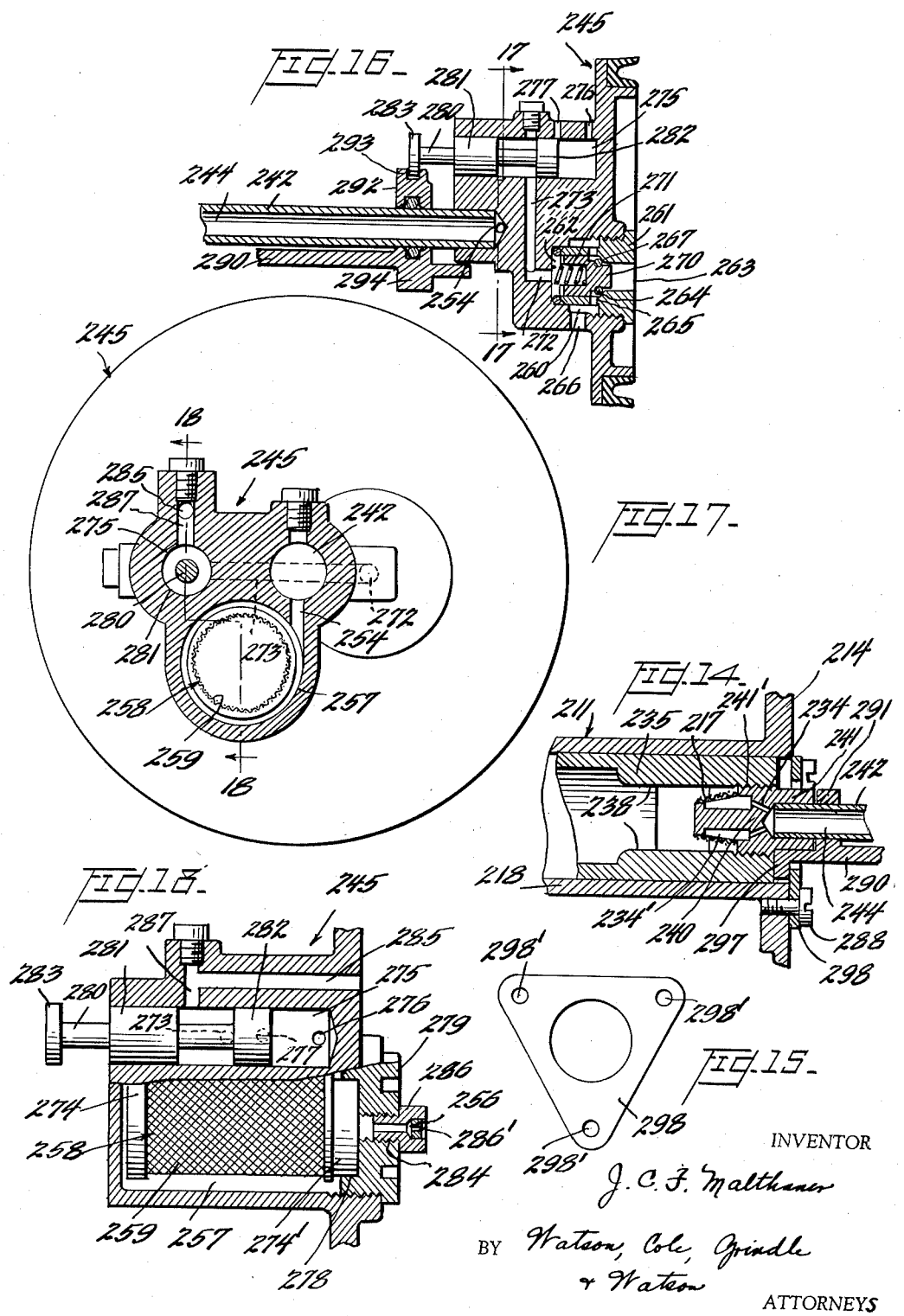

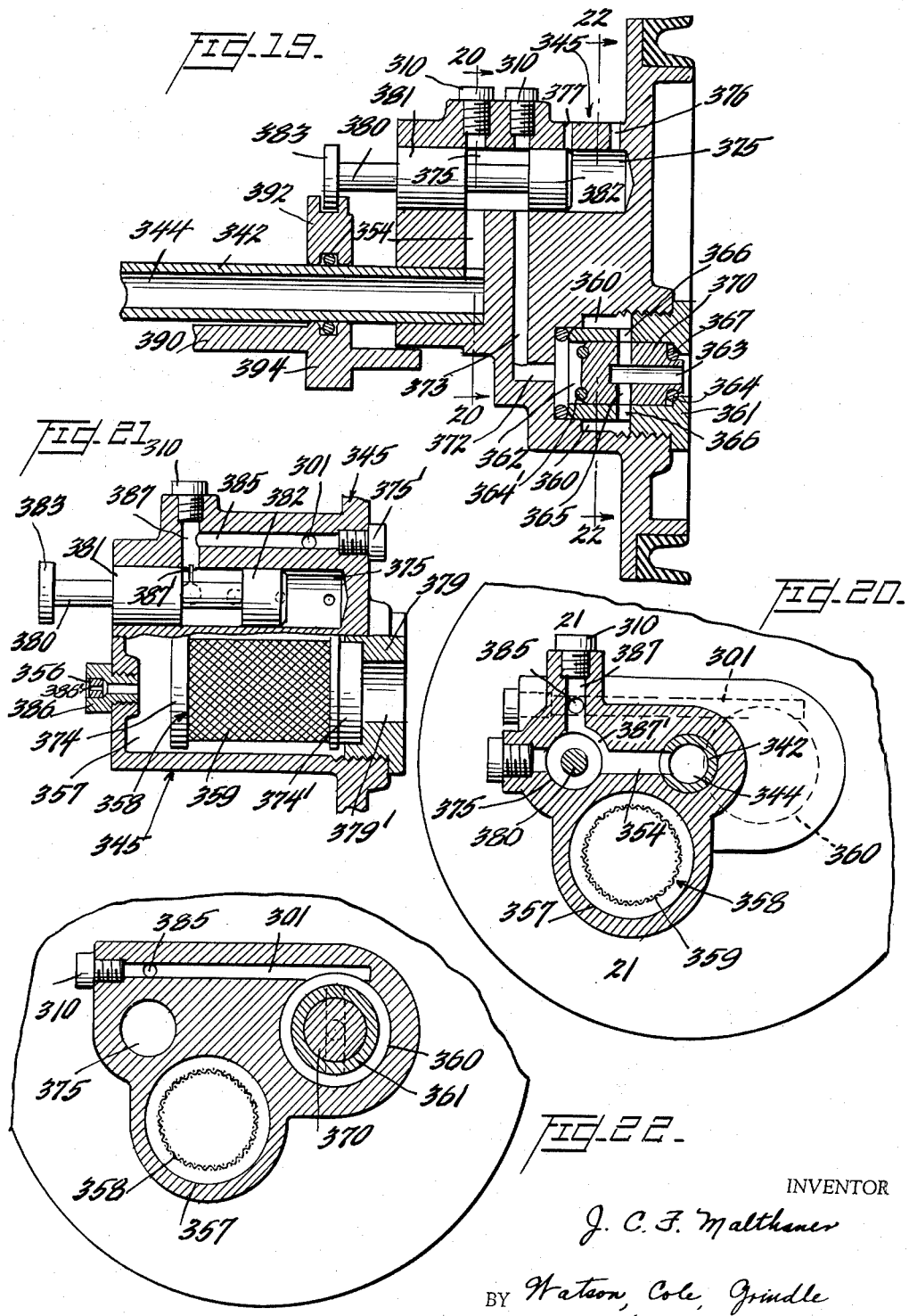

United States Patent Office 2,714,388
Patented Aug. 2, 1955

2,714,388

AUTOMATIC WATER DISTRIBUTORS

John C. F. Malthaner, Monrovia, Calif.

Application January 4, 1950, Serial No. 136,763

20 Claims. (Cl. 137—119)

This invention relates to automatic fluid distribution and more particularly to ways and means for directing the flow of a fluid from a source under pressure successively through a plurality of branch conduits, the operation being controlled by means of the pressure of the fluid received from said source.

In general, the broad objects and purposes of the present invention are similar to those of the invention disclosed in my prior United States Patent 2,059,126, namely to provide a novel and improved fluid distributor of this character which is of simple but sturdy construction having a minimum number of parts for performing the desired function; which requires no lubrication nor other maintenance service; and which will operate indefinitely to direct the fluid successively into the several outlet conduits for periods of predetermined duration, as long as fluid under pressure is supplied thereto.

Although my improved fluid distributor is susceptible of many uses—for example, in factories, chemical plants, refrigeration or heat exchange systems, or in fact in any installation in which a supply of fluid is to be delivered successively to different destinations—probably its most universal adaptation is in connection with irrigation systems for lawns, gardens, golf courses or the like, where it permits the watering of large areas by the use of pipes or conduits of small diameter and a moderate water supply of the usual domestic pressure.

In systems of this description, a plurality of pipes are generally laid under the ground and are provided at intervals with spray heads at approximately the ground level, each pipe supplying from two or three up to as many as fifteen or twenty heads depending upon the diameter thereof. The pipes which may be of any convenient number are connected to the distributing valve device and are placed successively in communication with a water supply conduit thereby. In this way large areas may be treated in successive sections, where the pressure of the water supply would be quite ineffective if it were called upon to irrigate the entire area at one time.

The advantages of this provision for the automatic repetition of the distributing cycle are considerable. For example, in irrigation systems the distributing device can be allowed to operate all night without attention; it being generally understood that night irrigation is more beneficial to plant life, since plant growth, or cell elongation takes place at night, and the irrigation is consequently at its greatest efficiency during this period. Another advantage of this continuous night operation of these systems is in the resulting lowering of the temperature in the vicinity of residences during hot nights, or in repelling light frosts, especially in the late fall.

Among the more particular objects attained by the present invention are the reduction or elimination of noise in the cyclic operations of the distributor, more accurate control and uniform timing of the operation of the device, and the provision of novel filtering means for protecting the mechanism from injury by particles which might be entrained in the fluid supply.

In its preferred embodiments, the invention contemplates the provision of distributor devices each comprising a casing which encloses two axially aligned cylindrical chambers of different diameters, the larger one functioning purely as a power cylinder within which the main driving piston of the differential distributing valve member reciprocates, and the smaller one being primarily a valve chamber having an admission opening for the fluid supply and a plurality of outlet ports controlled by the combined valve and piston member which reciprocates therein, said ports providing communication with the several systems of conduits which may be connected to the casing.

The cyclic reciprocations of the valve and piston are effected in the following way. The valve piston member which works in the distributing valve chamber is of smaller diameter than the power piston proper which moves in the larger cylinder, and the outward or remote face of this valve-piston member is continually subjected to the full pressure of the fluid during operation. The two differential cylinders are intercommunicating at their adjacent ends and the space between the valve-piston member and the larger power piston head is always subjected to a pressure lower than that of the source of fluid, this pressure being either atmospheric or such as prevails in one of the outlet conduits of the distributor. The outer or remote face of the main power piston head is selectively subjected to full or partial pressure and a by-pass is provided through this piston head from the high pressure side of the low pressure side. In certain of the preferred embodiments, both the furnishing of preponderant fluid pressure to the outer face of the power piston head and the controlling of the by-pass communication are effected by a novel hydraulic relay system which constitutes one of the important features of the device.

Novel arrangements are provided in the several embodiments of the invention for insuring a slow distributing movement of the piston valve member in one direction and a quick recovery or return movement in the other direction. The particular directions of movement vary among the different embodiments in accordance with the arrangements of the hydraulic relays and by-passes peculiar thereto.

Other objects and features of novelty, including the provision of certain novel fluid control passages, alternative forms of by-pass valves, filters, trips, and other elements, will be apparent from the following specification when read in connection with the accompanying drawings in which several embodiments of the invention are illustrated by way of example.

In the drawings:

Figure 1 is a view in side elevation of a distributor embodying the principles of the invention;

Figure 2 is a horizontal sectional view taken substantially on line 2—2 of Figure 1, the piston and distributor valve assembly being shown at the end of its left-hand travel;

Figure 3 is a similar view on an enlarged scale showing the valve and piston member at the end of its travel in the right-hand direction;

Figure 4 is a transverse sectional view taken on line 4—4 of Figure 3;

Figure 5 is a transverse sectional view taken on line 5—5 of Figure 3;

Figure 6 is a fragmentary longitudinal sectional view taken on line 6—6 of Figure 3;

Figure 7 is a fragmentary sectional view of a portion of the larger power piston member showing an alternative form of by-pass valve which is used in substitution for the ball valve shown in Figure 2;

Figure 8 is a fragmentary longitudinal sectional view similar to that shown in Figure 3 but illustrating an alternative embodiment of the invention;

Figure 9 is a fragmentary sectional view taken on line 9—9 of Figure 8;

Figure 10 is a fragmentary transverse sectional view taken on line 10—10 of Figure 9;

Figure 11 is a sectional view of an orifice member on a somewhat enlarged scale, the association of this orifice member with the other parts of the piston member being clearly indicated in Figure 9;

Figure 12 is a fragmentary longitudinal sectional view of the head portion of the distributor valve and piston element of Figure 8, but shown on an enlarged scale;

Figure 13 is a transverse sectional view taken on line 13—13 of Figure 12;

Figure 14 is a view similar to Figure 12 but showing an alternative embodiment of the filter portion of the distributor valve-piston;

Figure 15 is a view in elevation of a stop or trip bracket as seen from the right-hand end of Figure 14;

Figure 16 is a longitudinal sectional view through the main power piston of still another form of the invention;

Figure 17 is a transverse sectional view on an enlarged scale taken substantially on line 17—17 of Figure 16;

Figure 18 is an offset longitudinal sectional view taken substantially on line 18—18 of Figure 17;

Figure 19 is a longitudinal sectional view taken through the main power piston and associated parts in still another embodiment of the invention;

Figure 20 is a transverse sectional view taken on line 20—20 of Figure 19;

Figure 21 is an offset longitudinal sectional view taken on line 21—21 of Figure 20; and Figure 22 is a transverse sectional view taken substantially on line 22—22 of Figure 19.

In the embodiment of the invention illustrated in Figures 1–6 inclusive of the drawings, the novel distributing device is indicated in its entirety by the reference numeral 10 and as will be readily observed it comprises a casing which may conveniently be formed of a metallic casting 11 enclosing the distributing end of the device, and a cylinder 12 which may conveniently be comprised of drawn brass tubing. The right-hand end of the cylindrical casing portion of the device is closed by a flanged plate 13 which is threaded to the cylinder 12. At the other end of the cylinder 12 the casting 11 provides an end wall 14 which is flanged as at 15 to receive a threaded end of the cylinder 12, the parts 12, 13, and 15 enclosing the power or motor chamber 16 of the device.

The casting 11 has a generally tubular or cylindrical body portion 18 which has an internally threaded enlargement 19 at the left-hand end thereof to which is connected the supply conduit for carrying the fluid which is to be distributed. The whole device 10 may conveniently be supported by means of a base or pedestal 20 which forms part of the casting 11 and may be provided with the perforated ears 21 by which the device may be secured in a permanent position when desired. Extending laterally from the tubular portion 18 of the casting 11 are the internally threaded hollow bosses 23, 24, 25, and 26, into which may be threaded the several conduits comprising the fluid distributing system. Although only four connections for the distributing pipes are shown in this embodiment, it will be understood that any convenient number may be provided. The hollow interiors of these distributing bosses are connected with the interior of the cylindrical portion 18 by means of the slots 28, 29, 30 and 31.

Disposed for reciprocation within the cylindrical valve chamber 27 formed in the tubular portion 18 of the casting, is the hollow cylindrical distributing valve and piston member designated generally by the reference numeral 35. This member 35 is preferably made of plastic material rather than metal, thus avoiding any corrosion due to electrolytic action. Suitable plastics for this purpose are well known, and they include the vinyl type of plastics such as, for example, the polyvinylidene chlorides. The tubular side wall portion of the member 35 is provided with diametrically oppositely disposed rectangular openings or slots 36 and 37, and the remaining web portions of the member 35 between the slots 36 and 37 may be strengthened and reinforced by the longitudinal ribs 38. The valve-piston member 35 is provided with a solid end wall 40 and set securely within this wall is the metal insert 41 which is recessed to receive the left-hand end of the piston rod 42 which may be secured therein by means of the pin or rivet 43.

The piston rod 42 serves to rigidly connect the distributing valve-piston member 35 with the main power piston assembly designated generally by the reference numeral 45, the piston proper being of a circular disc-like configuration provided with a V-shaped packing ring 47. The piston assembly includes a casting provided with valves and fluid passageways which will be described presently. The right-hand end of the piston rod 42 is received within a recess in the piston casting 45 and is secured therein as by means of the pin 48.

Adjacent the threaded enlarged coupling end 19 of the casting 11, a threaded boss 49 is formed and leading from this outlet is a pipe 50, the other end of which connects with a needle valve assembly 51 which is threaded into an opening in a boss 52 in the end plate 13 of the power cylinder 12. The needle valve may be adjusted by a handle 53. By this means, a controlled flow of pressure fluid may be drawn off from the inlet portion of the device and applied to the power cylinder upon the right-hand side of the main power piston 45.

The space between valve piston 35 and power piston 45, constitutes an accumulation chamber for spent fluid, which it is desirable to maintain at or near atmospheric pressure. In wall 14 of the cylinder an opening through which spent fluid may pass through pipe 55 to a sump, or pipe 55 may connect with the elbow check valve 56, outlet 26 and conveyed therefrom. The check valve 56 prevents fluid from flowing in pipe 55 only when opening 37 is brought into registry with the elongated slot 31.

Thus far, it will be readily seen that the valve-piston 35 and the power piston 45 form a differential piston system, and when the moving parts are in the positions shown in Figure 3 of the drawings, and fluid under pressure is admitted to the left-hand end of the valve chamber 27 and also to the right-hand end of the power cylinder 12, by means of the piping 50, the preponderance of pressure will be upon the right-hand end of the system and the parts will move toward the left at a speed which may be regulated by means of the needle valve 51. As the valve member 35 moves toward the left the fluid will pass out of the valve opening 36 and through the slot 28 thus supplying fluid to the outlet 23. Further movement of the piston will bring the outlet 37 into registry with the slot 29 and fluid will then be supplied to the outlet 24. Still further movement will bring the valve outlet 36 into registry with the slot 30 and outlet 25 will be supplied with fluid. Finally, valve opening 37 will register with the slot 31 and the last outlet connection 26 will be supplied. Two small drilled openings 76 and 77 are provided in a wall of the chamber 75 within the piston casting 45, and these openings place the chamber 75 into communication with the low-pressure left-hand side of the piston 45 under conditions to be presently described.

The means for effecting the return stroke of the valve and the continued cyclic operation of the device will now be described. Referring more particularly to Figures 2, 3 and 6 of the drawings, it will be seen that the main piston casting 45 is provided with a recess 60 within which is threaded an insert 61, the insert 61 being hollowed to provide a valve chamber 62 and a passageway 63 leading from the right-hand side of the piston 45 into the valve chamber. The forward end of the insert 61 is sealed against the rear wall of the recess 60 by means of the gasket 64. Radial passageways 65 lead from the interior of the valve chamber 62 adjacent the passage 63 and provide communication with the interior of the recess 60. Another radial passageway 66 formed in the casting connects the recess 60 with the power chamber 16 upon the left-hand or low-pressure side of the piston 45.

The margins of the inner end of the passageway 63 provide a valve seat against which the ball valve 70 may repose under the influence of the coil spring 71. In the rear wall of the recess 60 there is drilled a passageway 72 which communicates with a transverse passageway 73 which leads to a longitudinal fluid control chamber 75 formed in the piston casting 45. Communication between the chamber 75 and the left-hand low pressure portion of the power cylinder 16 is provided by means of the passageways 76 and 77.

Mounted for reciprocation within the chamber 75 is the spool-like counterbalanced piston valve or plunger 80 provided with enlargements 81 and 82 and extending exteriorly of the chamber 75 and terminating in a flanged end 83.

Turning now to Figure 6 of the drawings, which is a longitudinal sectional view taken at right angles to the view shown in Figure 3 and through the axis of the chamber 75, it will be seen that a bore or passageway 85 is formed in the casting 45 parallel with the chamber 75. The bore 85 opens at 86 through the right-hand face of the piston 45 into the high pressure side of the power chamber or cylinder 16 and the opposite end of the bore 85 is connected by means of the short cross duct 87 opening into the chamber 75 at a point leftward of the passageway 73. It will be seen that the chamber 75 is pierced with transverse openings in the following order: 76, 77, 73 and 87. Opening 76 provides the same pressure on the remote end of the head 82 as on the outer end of the head 81 to counterbalance the plunger. The spacing between the plunger enlargements 81 and 82 is such that in one position of the plunger, passageway 73 is placed in communication with passageway 77, this being the condition illustrated in Figure 2 of the drawings. At the opposite end of movement of the plunger 80, the space between the heads 81 and 82 provides communication between passageway 73 and passageways 87, 85, thus placing passageway 73 in communication with the high pressure side of the piston 45. This is the condition illustrated in Figures 3 and 6 of the drawings.

For automatically actuating the control plunger 80 there is provided the double trigger member 90 which rides upon the piston rod 42, perforated projections 91 and 92 on the trigger member being adapted to receive the rod. The projection 92 is provided with a slot 93 which receives a portion of the margin of the flange 83 of the plunger 80. A stop projection 94 extends from the element 90 in the opposite direction to the projection 92. A flat projection 95 extends alongside of the flat surface 96 on the piston casting 45 and insures that the trigger element 90 does not rotate unduly upon the piston rod 42 so that the projection 92 would become disengaged from the plunger head 83. At the left-hand end of the trigger member 90 beyond the projection 91 is the stop projection 97. The projections 91 and 92 are so disposed as to permit a limited sliding movement of the trigger 90 with relation to the piston rod 42, the limits of this movement being apparent from a comparison of Figures 2 and 3, and this movement is of sufficient extent to effect the movement of the plunger 80 from one of its end positions to the other.

In order to cause relative movement between the valve and piston assembly and the trigger 90, a tripping plate 98 is secured to the interior of the housing adjacent the left-hand end of the power cylinder 16. In order to prevent creeping or any other unintended movement of the trigger member 90 and its connected plunger 80, a snubber ring 99 is provided which snugly embraces the piston rod 42 and is clamped or compressed between the rod and the trigger 90 so as to provide sufficient friction to prevent accidental movement, but insufficient to prevent the required shifting movement of the parts at the end of each stroke of the pistons.

The operation of this embodiment of the device will now be described. In Figure 3 of the drawings, the parts are shown in the positions they occupy at the beginning of the movement toward the left, that is, at the beginning of the distributing stroke. The needle valve 51 has been adjusted for the proper speed of movement and this speed may be accurately controlled so that the cycle may vary from approximately two and one-half minutes to a period many times that duration. It will be noted that the plunger 80 is at its left-hand limit of movement whereby high-pressure fluid from the right-hand side of the power piston 45 may pass through the passageways 85 and 87 into the plunger chamber 75 between the heads or enlargements of the plunger and out through the passageways 73 and 72 into the valve chamber 62 at the left-hand side of the ball valve 70. Of course, the right-hand side of the ball valve is also subjected to high-pressure fluid through the passageway 63, but the coil spring 71 urges the valve toward its seat and prevents the by-passage of the fluid from the high-pressure side of the piston to the low-pressure side. The power piston 45 having a greater area than the head of the valve-piston 35, the preponderance of pressure causes the parts to move toward the left at a speed regulated by the valve 51 so that the outlets 23—26 are successively placed into communication with the pressure fluid during the leftward travel of the valve. Fluid occupying the left-hand or low pressure side of the power chamber 16 may pass through the pipe 55 to one of the fluid outlets during this movement of the piston.

Near the end of the distributing stroke, the stop projection 94 on the trigger member 90 strikes against the right-hand face of the annular stop plate 98, and during continued movement of the piston and valve assembly the trigger 90 is held stationary and thus the control plunger 80 undergoes relative movement with respect to the piston assembly toward the right through the chamber 75, cutting off the opening 87 from the high-pressure side of the piston and placing the passageway 73 into communication with the opening 77 leading into the low pressure portion of the cylinder. This relieves the left-hand face of the ball valve 70 from the high pressure fluid and the ball valve moves away from its seat under the influence of the pressure through the opening 63 and the fluid is by-passed through the passageways 63, 65, and 66 to the low-pressure side. Under these conditions the pressure of the fluid against the left-hand face of the valve-piston head 40 (the pressures against the power piston 45 being equalized) causes the valve-piston assembly to move toward the right. This recovery movement will be fairly rapid and will continue until the stop projection 97 on the trigger 90 strikes against the left-hand face of the annular stop or tripping ring 98 toward the end of the travel. The remainder of the movement of the assembly will be while the trigger 90 and plunger 80 are stationary, and the relative movement of the plunger 80 in the chamber 75 will again place the passageway 73 in communication with the high-pressure side of the piston as in the conditions shown in Figures 3 and 6 of the drawings, whereupon the distributing cycle will be repeated.

The valve 70 and plunger 80, together with the various connections and automatic manipulating means may be said to comprise a hydraulic relay, this relay being actuated by the same pressure fluid that is to be distributed by the device. This provision makes for efficient and unfailing operation and eliminates any noise which might attend the use of snap-acting valve controls.

In Figure 7 there is illustrated a variant form of by-pass or check valve which may be substituted for the ball check valve 70 illustrated in the first described embodiment or for any of the corresponding by-pass valves illustrated and described in subsequent embodiments. This modified form of valve comprises a cup-shaped plug 70'. The valve is provided with an annular washer or gasket 69 which seats against the margins of the by-pass passageway 63 adjacent the radial openings or passageways 65 which lead from the interior 62 of the valve casing or insert 61. A recess 68 in the valve 70' provides a seat and housing for the coil spring 71 which urges the valve toward its seat. The valve 70' functions in exactly the same manner as the ball valve 70 but has certain advantages among which may be mentioned the provision of the sealing washer or gasket 69 which provides a more effective closure and serves to silence the operation of the valve.

In Figures 8–13 of the drawings there is illustrated another embodiment of the invention which comprises a distributor indicated generally by the reference numeral 100. In these illustrations, wherever feasible, parts that are the equivalents of parts already described in connection with the first embodiment, will be given the same reference numerals but with one hundred added. Thus the distributor casting is designated 111, the tubular power casing 112, its end wall 113, and the opposite end wall 114 with its threaded flange 115. The power cylinder or chamber within which the main piston 145 moves is designated 116.

The various parts of the body portion 118 of the distributor valve casting 111 are of the same structure and have the same function as the corresponding parts in the embodiment previously described. However, the combined valve and piston member 135 is of a somewhat different construction. Here, as in the former case, the greater portion of this member is preferably made of plastic in order to avoid electrolytic action, but the reinforcement and means of connection of the valve member to the piston rod 142 are somewhat different. Valve openings 136 and 137 are provided, but the ribs 138 contain reinforcing and securing pins or rods 139, the right-hand ends of these rods being firmly and rigidly received within openings in the metal end insert 141 which provides the end wall 140 of the combined valve and piston member 135. The insert 141 is provided with an opening or recess which receives the piston rod 142.

The piston rod 142 in this case is hollow having a central bore or passageway 144 extending from one end to the other thereof. The metal insert 141 is also hollow and is internally threaded to receive the filter plug 132, this plug being adapted to seat firmly against a packing gasket or washer 133 at the bottom of the hollow threaded opening in the insert 141. The filter plug 132 is provided with a circular series of longitudinal passageways 134 and the central portion of the element 132 is extended as the cylindrical projection 122. A frusto-conical wire screen element 117 is fitted to the left-hand portion of the insert 132 so as to cover the openings into the passageways 134. The smaller opening in the screen is fitted around the extension 122 and soldered thereto as at 122'; the larger end of the conical screen 117 is soldered to the larger body portion of the plug 132 as shown at 132'.

The purpose of providing the bore or passageway 144 in the piston rod 142 is to carry pressure fluid to the right-hand side of the power piston 145 in a way which will eliminate the necessity for the pipe line 50 with its controlling needle valve 53. Thus in this embodiment the end cap 113 of the power cylinder may be made imperforate and certain additional passageways are provided in the power piston casting 145 for transmitting the power fluid to the high pressure side thereof. At the right-hand end of the tubular piston rod 142 the side wall is cut away as at 146 and a passageway 154 leads from this point into the control plunger chamber 175 at a point to the left of where the passageway 173 enters.

Vents from the chamber 175 to the low-pressure side of the power cylinder 116 are indicated at 176 and 177. The relative positioning of the openings 176, 177, 173 and 154 will be readily understood from an inspection of Figure 9 of the drawings. The passageway 154 is in the same transverse plane as the opening 187 which leads from the plunger chamber 175 to the parallel bore or passageway 185 which in turn opens into the high-pressure side of the piston. The mouth of the passageway 185 is, however, provided with a threaded plug 186 which has an opening therethrough within which is fixed a hard plug or insert 156 which may be made of a jewel such as synthetic sapphire or the like drilled with a fine accurately formed throttling bore 186' therein. The plug 186 with its jewelled orifice 186' is interchangeable and larger or smaller orifices may be provided depending upon the desired timing of the distributor.

By an inspection of Figure 10 of the drawings, it will be noted that the wall of the chamber 175 between the opening from the duct 154 and that from the passageway 187 is grooved as at 187' so that even if the enlargement 181 of the plunger 180 lies opposite the passageways 154 and 187 there will still be communication therebetween.

The power piston casting 145 is provided with piston packing 147 and is also provided with a recess or cavity 160 within which is threaded the insert 161, this insert having a central passageway 163 which is widened at its left-hand end to provide a shoulder 167 against which the packed check valve member 170 may seat. The stem 170' of the valve 170 reciprocates within the longitudinal passageway 172 and the end of this passageway communicates with the transverse passageway 173 as in the previously described embodiment. Outlet passages 166 lead from the valve chamber 160 to the low-pressure side of the power cylinder 116.

In this embodiment the snubber ring 199 is seated within an annular recess 199' within the enlargement 192 of the trigger member 190, but performs the same function as the snubber 99 disclosed in the first embodiment. The stop ring or tripping plate 198 is also of the same structure and has the same function as the equivalent member in the first embodiment, in tripping the projections 197 and 194 of the trigger 190 at the ends of the movements of the piston valve in either direction.

The operation of the distributor illustrated in Figures 8–13 inclusive will now be described. Instead of passing through an external pipe 50 and the controlling needle valve 51, a certain portion of the pressure fluid passes through the annular series of openings 134 in the filter plug 132 which is threaded into the wall 140 of the valve piston, the fluid having been filtered by passing through the screen 117. This fluid then passes through the bore or passageway 144 in the piston rod 142 and thence through the passageway 154 in the main piston casting 145 toward the control plunger chamber 175. Assuming that the parts are in the positions shown in Figure 8 where the combined valve and piston assembly is about to start its slow distributing movement toward the left, it will be seen that the space between the heads 181 and 182 of the plunger 180 straddles the passageways 154 and 173 and also permits full passage of fluid into the opening 187 which leads to the bore 185. The pressure fluid thus passes through the passageways 173 and 172 and applies pressure to the valve stem 170' thus tending to close the valve against its seat 167. The pressure fluid passing through passageways 187 and 185 emerges into the high-pressure side of the power cylinder 116 through the fine opening 186' in the graduated plug 186. Thus during the left-hand movement of the assembly pressure fluid is gradually passed to the right-hand side of the power piston while at the same time the by-pass valve 170 is held closed. The differential piston assembly 135, 145 thus moves toward the left under the preponderance of pressure.

Now when the assembly is approaching its limiting movement toward the left and the projection 194 of the trigger 190 is tripped by the stationary abutment plate 198, the plunger 180 moves relatively to the casting 145 and the enlargement 181 gradually covers the openings 154 and 187 and the enlargement 182 eventually uncovers the opening or vent 177 placing the latter in communication with the passageway 173 and cutting off the supply of pressure fluid from the opening 154 thereto. This relieves the pressure upon the valve piston or stem 170' and prepares the valve 170 for opening to by-pass the fluid and equalize the pressures upon both sides of the power piston 145.

However, it is necessary to maintain at this time some elevated pressure upon the right-hand face of the piston in order to promptly open the valve 170 and not delay unduly the return or recovery movement of the assembly and thus prolong the discharge through the last outlet 126. This purpose is accomplished by the by-pass groove or slot 187' which permits the passage of a certain amount of pressure fluid from the duct 154 to the passageways 187 and 185 and thence through the restricted orifice 186' to the high-pressure side of the piston.

Under these conditions, the valve 170 opens, thus tending to equalize the pressure upon both sides of the power piston 145 and permitting the valve-piston head 140 to move the assemblage quickly toward the right during the recovery cycle.

The filter screen 117 is particularly useful in this embodiment in excluding particles from the fluid which might clog the restricted orifice 186'.

In the embodiment illustrated in Figures 14–18 inclusive of the drawings, the pressure fluid is again fed from the left-hand end of the casing through the interior of the valve and piston member 235 and thence through the passageway 244 in the hollow piston rod 242 into the main power piston casting 245.

As most clearly shown in Figure 14, the valve-piston member 235 is provided with the reinforcing ribs 238 and a metal insert 241 is threaded into the body portion of the piston as at 241'. The insert 241 has a tubular portion into which the left-hand end of the piston rod is sweated. The intermediate web of the insert 241 constitutes the wall 240 of the piston portion of the member 235 and this wall is pierced by a circular series of passageways 234 leading from the chamber 234'. A frusto-conical filter screen 217 encloses the chamber 234' and serves to exclude from the operating mechanism any particles of solid material which may be in the stream of fluid.

Referring now more particularly to Figures 16, 17 and 18 of the drawings it will be seen that the right-hand end of the hollow piston rod 242 is received within an opening in the piston casting 245 and leading from this opening or recess is a passageway 254 which is tangent to a cylindrical chamber 257 formed in the casting 245, extending longitudinally thereof and housing a filter or strainer cartridge 258 having a strainer element or screen 259 of relatively fine mesh, say approximately 100 mesh. The wire screen 259 is supported in any suitable fashion as by means of the end caps 274 and 274', the latter of which is received within the circular recess 278 formed within the screw plug 279 which is threaded into the high pressure face of the casting 245. This plug is provided with a central threaded opening 284 within which is threaded an orifice plug 286 having a jewel 256 with a fine orifice 286' exactly as shown in Figure 11 of the drawings in connection with an earlier described embodiment of the invention.

The hydraulic relay feature in this embodiment is similar in its basic details to the earlier mentioned forms. A trigger element 290 is provided with stops 294 and 297 and a projection 292 near its right-hand end has a recess 293 adapted to receive the flange 283 of the plunger 280. The plunger 280 is adapted to move in the chamber 275. This chamber is provided with the pressure vents 276 and 277 and the passageway 273 leading to the duct 272 which affords communication with the left-hand side of the relay or by-pass valve 270. The valve reciprocates within the valve chamber 262 provided in the threaded insert or plug 261 which has an opening 263 leading to the right-hand face of the valve. The valve 270 comprises a recessed plug element similar to the one shown in Figure 7 of the drawings and is provided with a gasket 264 which seats against the shoulder 267. A circular series of radial openings 265 lead through the walls of the hollow plug 261 into the annular space 260 from which fluid may pass through the duct 266 into the left-hand portion of the power chamber 216.

The valve 270 is cupped out to receive a coil spring 271 which serves to urge it to the right toward its seat 267.

Parallel with the plunger chamber 275 is the duct or passageway 285 which is connected with the chamber 275 by means of the cross passageway 287. The opening into the duct 287 is in the same transverse plane as the passageway 273 and is controlled by the heads 281 and 282 of the plunger 280.

The stop or tripping ring 298 in this embodiment is of a somewhat different construction from the corresponding element in the previously described forms of the invention. This member is preferably of triangular configuration provided with three openings 298' through which are passed bolts or screws 288 which are threaded into the wall 214 of the left-hand end of the power cylinder.

The central opening in the stop ring 298 receives the hollow piston rod and also the trigger 290, and the respective stop projections 294 and 297 abut either side of the ring 298 near the ends of the travel in each direction.

The operation of the embodiment shown in Figures 14–18 inclusive will be readily understood. With the parts in the position shown in Figure 16, the assembly is about to travel toward the left to accomplish the relatively slow distributing stroke of the device. Pressure fluid is continually passing through the hollow piston rod 242, through the duct 254 into the filter chamber 257 externally of the strainer element 258. The fluid passes through the filter screen leaving any solid particles upon the outside of the screen and then passes through the end cap or sleeve 274' of the filter and thence through the interchangeable jet orifice insert 256 in the plug 286 and thence into the power chamber 216 upon the right-hand side of the piston 245. In this way, pressure fluid is applied to the right-hand face of the power piston 245 at a regulated rate, depending upon the diameter of the orifice 286' in the jet insert 256, the proper jet plug being selected for the speed of movement desired.

In this embodiment, it will be perceived, the pressure fluid passing through the hollow piston rod moves directly through the filter and orifice to the right-hand side of the piston without entering the hydraulic relay chambers and passageways. The relay is actuated in this case by fluid which passes back from the right-hand side of the piston 245 through the duct 285 and opening 287 into the chamber 275, when the plunger 280 is in the position indicated in Figures 16 and 18. From the chamber 275 the pressure fluid passes through the ducts 273 and 272 into the left-hand face of the by-pass valve 270, and this pressure together with the pressure exerted by the spring 271, keeps the by-pass valve 270 closed and the pressure on the right-hand face of the piston moves the assembly to the left.

Upon tripping the projection 294 on the trigger 290 the plunger 280 moves relatively to the right in the chamber 275, covering the high pressure inlet opening 287 and placing the duct 273 in communication with the low pressure relief passageway 277. This relieves the pressure from the left-hand side of the by-pass valve 270 and the pressure fluid which continually flows from the fine orifice 256 to the right-hand side of the piston 245 exerts pressure on the right-hand side of the valve 270 through the passageway 263, thus forcing the valve open and tending to equalize the pressure on both sides of the power piston 245, whereupon the preponderance of pressure upon the wall 240 of the combined valve and piston assembly 235 causes the entire assembly to move through the recovery or return stroke toward the right.

The fine wire screen 259 effectively prevents any foreign particles from clogging the narrow orifice 286' and interfering with the operation of the device.

The embodiment illustrated in Figures 19–22 inclusive of the drawings will now be described. The valve-piston portion 335, 340 (not shown) may be the same as the corresponding parts 235, 240 previously described or similar to the parts 135, 140 of the embodiment illustrated in Figure 12. The pressure fluid is conducted through the duct 344 in the hollow piston 342 to the interior of the piston casting 345 and passes through the duct 354 to the plunger chamber 375 in which the controlling plunger 380 reciprocates in accordance with the movement of the trigger 390 which is operatively connected thereto by way of the parts 392 and 383. A passageway 373 and duct 372 leads from the chamber 375 to the left-hand side of the by-pass piston 370, this piston being housed in a hollow plug or insert 361 and reciprocable in the hollow interior 362 thereof. The valve 370 is provided with packing 364 which seats against the shoulder 367. A similar packing ring 364' is secured to the left-hand end of the valve 370 and both of these packing rings serve to silence the operation of the valve when it impinges upon either end of the chamber 362 in which it reciprocates. A duct 363 is provided in the valve 370 and radiating passageways 365 register with openings 366 in the intermediate portion of the plug 361 which lead to the external chamber 360 formed in the casting 345.

The plunger chamber 375 is also provided with the ducts 376 and 377 which lead to the left-hand portion of the power cylinder 316 (equivalent to the cylinder 16 of Figure 2).

Paralleling the plunger chamber 375 is the duct 385 which is connected with the chamber 375 by means of the opening or passageway 387. The passageway 385 is located similarly to the correspondingly numbered passageways of the previous embodiments, but the end of the passageway adjacent the right-hand face of the piston 345 is plugged as by the threaded element 375'. A transverse duct 301 intersects the passageway 385 and connects it with the chamber 360 which surrounds the insert 361 in which the by-pass valve 370 moves.

The wall of the chamber 375 in the transverse plane of the openings 354 and 387 is grooved or slotted as at 387' which provides a permanent by-pass of fluid between the duct 354 and the passageway 387 at all times independently of the position of the enlargement 381 of the plunger 380.

For transmitting pressure fluid from one side of the power piston 345 to the other a rather direct system of passageways and openings is provided as will be readily perceived in Figure 21 of the drawings. A substantially cylindrical filter chamber 357 is provided in the casting 345, one end of the chamber being threaded to receive the plug 379 which may serve to support the filter cartridge 358 which may include the imperforate head or cap 374 and the oppositely disposed sleeve or ring 374' seated within a recess in the plug 379. The screen mesh 359 serves to filter out fine particles which might clog the fine jet opening which regulates the rate of flow and thus the speed of distribution. The jet plug is indicated at 386 and is provided with the jewel insert 356 with the fine opening 386' pierced therethrough. An opening 379' leads through the head of the plug 379 to the interior of the filter screen.

The operation of this embodiment of the invention differs from the others in that the relatively slow distributing stroke of the valve and piston assembly is from left to right and the rapid return stroke is from right to left. When the parts are in the position shown in Figure 19 of the drawings, the assembly is moving through the rapid return stroke toward the left-hand side of the figure. The pressure fluid passing through the hollow piston rod 342 is supplied to the plunger chamber 375 through the duct 354 and is directed down the passageways 373 and 372 to the left-hand face of the valve 370, thus urging the valve toward its right-hand limit with the buffer ring or packing 364 against the seat 367. This places the radial ducts 365 in the valve 370 in registry with the ducts or openings 366 in the plug 361 and thus opens the chamber 360 to the power cylinder 316 at the right of the piston 345.

At the same time pressure fluid from the duct 354 and the intermediate portion of the chamber 375 between the enlargements of the plunger 380, passes through the cross-passageway 387 into the longitudinal duct 385 and thence transversely through the duct 301 to the chamber 360 and thence through the registering openings 366 and 365 and out the longitudinal valve passage 363 to the right-hand side of the piston. This relatively unobstructed flow of pressure fluid to the cylinder on the right-hand side of the piston causes the relative rapid return movement of the piston toward the left.

When the trigger 390 is tripped by abutment of the projection 394 against the tripping plate 398, the plunger 380 moves relatively toward the right in the chamber 375 throwing the duct 373 into communication with the passageway 377 on the low-pressure side of the system and thus relieving the pressure on the left-hand face of the by-pass valve 370. The pressure on the right-hand side of the valve 370 moves the by-pass valve to the left and cuts off communication between the radial passageways 365 and 366. When this happens, a large supply of fluid is trapped on the right-hand side of the power piston 345 but is not under full pressure. Pressure of power fluid against the left-hand side of the wall 340 of the valve-piston 335 (corresponding to the similarly numbered elements of the previous embodiments) tends to move the piston and valve assembly toward the right. This movement is resisted by the trapped body of fluid to the right-hand side of the piston 345, but this fluid can gradually be displaced to the left-hand side of the piston through the passageway 379', through the filter cartridge 358, and finally through the graduated selectable fine passageway 386' of the plug 386, and thus the rate of movement of the assembly from left to right during the distributing stroke may be regulated.

One advantage of the embodiment of the invention last described lies in the ability to obtain a much longer distributing period for each cycle than in the earlier embodiments with the use of the same size of orifice 286' in the selectable jet plug 286. Also, the buffer rings 364 and 364' make for quieter operation.

In all of the illustrated embodiments, there are well-known constructional features which it is not believed necessary to describe. For example, where internal passageways have to be drilled or bored the drill has to pass through certain external walls of the casting and these openings are readily plugged by small threaded inserts such as indicated at 310 in the embodiment last described. Also, when desired, the relay control plungers 80—380, as well as the relay valves 70—370 may be made of plastic similar to the valve-piston members 35—335.

Various other changes and modifications may be made in the embodiment illustrated and described herein without departing from the scope of the invention as defined by the following claims.

Having thus described the invention, what is claimed as new and desired to be secured by Letters Patent is:

1. In a device of the class described, a power cylinder, a motor piston member reciprocatable within said cylinder, a passageway through said piston member through which pressure fluid may be transferred from one side of said piston member to the other to control the reciprocating movement thereof, a cylindrical valve chamber within the piston member and comprising an enlargement of said passageway, a reciprocatable valve in said chamber adapted to cut off flow through said passageway when in one end position of movement and open said passageway to flow of fluid when in the opposite end position, end walls of said valve chamber adapted to stop the valve at the ends of its movements, and resilient buffer silencer elements carried by each end of said valve, a duct in said piston member leading to an end surface of said valve, other ducts in said piston member leading respectively to a high pressure zone in the cylinder and to a low pressure zone therein, a second valve chamber in said piston member, a fluid pressure counter-balanced control valve in said second chamber adapted to alternatively place said first-named duct in communication with said two last-named ducts, and means subject to movement of the piston member in either direction to actuate said control valve.

2. In a device of the class described, a piston member, a valve chamber in said piston member having an axis parallel with the axis of the piston member, a passageway of smaller diameter than and coaxial with said valve chamber leading to one end of said chamber and forming a valve seat at the junction of said passageway and said chamber and opening out through one face of the piston member, a passageway leading transversely from said valve chamber to the opposite face of said piston member and a valve member disposed for axial reciprocation in said valve chamber to move to and from said seat to open and cut off communication between said passageways, a duct leading to said valve chamber at the end thereof opposite the first-named passageway and connected with that portion of the valve chamber rearwardly of said valve member, and means for alternatively placing said duct into communication with a source of fluid pressure and exhaust.

3. In an automatic fluid distributing system, in combination, a source of fluid under pressure, a plurality of conduits leading to points of delivery of said fluid, and a distributing device for successively placing said conduits in communication with said source of supply, said device comprising a casing enclosing in axial alignment a valve chamber and a power cylinder, the cross-sectional area of the power cylinder being greater than that of the valve chamber, an inlet port for pressure fluid from said source at the end of said valve chamber remote from said power cylinder, said chamber also having a longitudinal series of outlet ports communicating respectively with said conduits, a distributing valve member disposed for reciprocation in said valve chamber so as to successively provide communication between said inlet port and said outlet ports, an actuating piston disposed for reciprocation in said power cylinder, and a hollow piston rod rigidly connecting said valve member and said actuating piston to provide a unitary differential valve and piston assembly, means for maintaining the mutually inwardly directed faces of said valve member and said piston at all times during operation subject to pressure lower than that of the fluid from said source, means for applying fluid under pressure at all times during operation to the outward face of said valve member; a passageway passing longitudinally through said valve member, said hollow piston rod, and into the interior of said piston; other passageways in said piston leading through the respective faces thereof through which said pressure fluid may be passed to determine the preponderance of pressure on one side or the other of said assembly to effect its movement in either direction, a valve in certain of said passageways to control the passage of fluid therethrough, a duct supplying pressure fluid to a surface of said valve to actuate it, and valve controlled ducts for alternatively connecting said first-named duct with the first-named fluid pressure supplying passageway or with the low pressure inward side of the piston, to actuate the valve.

4. In a distributing device of the class described, a casing, a distributing valve chamber and a power cylinder axially aligned within said casing, the power cylinder having a greater cross-sectional area than the valve chamber; a differential distributor valve and piston assembly comprising a distributor valve member adapted to move in said valve chamber, a motor piston movable in said power cylinder, and a piston rod rigidly connecting the two; means for admitting fluid under pressure to the outer end of the valve chamber and a plurality of outlet conduits leading from said valve chamber and controlled by the distributor valve member, the outer end of said power cylinder being closed, and a throttled pressure fluid passageway passing longitudinally through said distributor valve member, said piston rod, and said piston to the power cylinder upon the outer side of the piston.

5. In a distributing device of the class described, a casing, a distributing valve chamber and a power cylinder axially aligned within said casing; a distributor valve and piston assembly comprising a distributor valve member adapted to move in said valve chamber, a motor piston movable in said power cylinder, and a piston rod rigidly connecting the two; means for admitting fluid under pressure to the outer end of the valve chamber and an outlet conduit leading from said valve chamber and controlled by the distributor valve member, the outer end of said power cylinder being closed, and a throttled pressure fluid passageway passing longitudinally through said distributor valve member, said piston rod, and said piston to the power cylinder upon the outer side of the piston; the throttling means comprising a fluid pressure actuated valve.

6. In a distributing device of the class described, a casing, a distributing valve chamber and a power cylinder axially aligned within said casing; a distributor valve and piston assembly comprising a distributor valve member adapted to move in said valve chamber, a motor piston movable in said power cylinder, and a piston rod rigidly connecting the two; means for admitting fluid under pressure to the outer end of the valve chamber and an outlet conduit leading from said valve chamber and controlled by the distributor valve member, the outer end of said power cylinder being closed; and a throttled pressure fluid passageway passing longitudinally through said distributor valve member, said piston rod, and said piston to the power cylinder upon the outer side of the piston; the throttling means comprising an interchangeable jet plug in the piston passageway having a fine jet orifice therein of selective capacity.

7. In a distributing device of the class described, a casing, a distributing valve chamber and a power cylinder axially aligned within said casing; a distributor valve and piston assembly comprising a distributor valve member adapted to move in said valve chamber, a motor piston movable in said power cylinder, and a piston rod rigidly connecting the two; means for admitting fluid under pressure to the outer end of the valve chamber and outlet conduits leading from said valve chamber and controlled by the distributor valve member, the outer end of said power cylinder being closed; a throttled pressure fluid passageway passing longitudinally through said distributor valve, said piston rod, and said piston to the power cylinder upon the outer side of the piston; the throttling means comprising an interchangeable jet plug in the piston passageway having a fine jet orifice therein of selective capacity; and a filter carried by said distributor valve adjacent the mouth of the passageway therethrough to prevent any extraneous particles in the pressure fluid from passing into the passageway of the piston.

8. In a distributing device of the class described, a casing, a distributing valve chamber and a power cylinder axially aligned within said casing; a distributor valve and piston assembly comprising a distributor valve member adapted to move in said valve chamber, a motor piston movable in said power cylinder, and a piston rod rigidly connecting the two; means for admitting fluid under pressure to the outer end of the valve chamber and outlet conduits leading from said valve chamber and controlled by the distributor valve member, the outer end of said power cylinder being closed; a throttled pressure fluid passageway passing longitudinally through said distributor valve, said piston rod, and said piston to the power cylinder upon the outer side of the piston; the throttling means comprising an interchangeable jet plug in the piston passageway having a fine jet orifice therein of selective capacity; a filter chamber in said pressure fluid passageway where it passes through said piston, and a removable filter cartridge in said chamber for preventing any extraneous particles in the pressure fluid from passing into the passageways of the piston.

9. In a distributing device of the class described, a casing, a distributing valve chamber and a power cylinder axially aligned within said casing, the power cylinder having a greater cross-sectional area than the valve chamber; a differential distributor valve and piston assembly comprising a distributor valve member adapted to move in said valve chamber, a motor piston movable in said power cylinder, and a piston rod rigidly connecting the two; means for admitting fluid under pressure to the outer end of the valve chamber and a plurality of outlet conduits leading from said valve chamber and controlled by the distributor valve member, the outer end of said power cylinder being closed; a pressure fluid passageway passing longitudinally through said distributor valve member, said piston rod, and said piston to the power cylinder upon the outer side of the piston; a by-pass passageway leading through the piston from one side to the other thereof; and a constriction in said by-pass passageway of selective graduated cross-section.

10. In a distributing device of the class described, a casing, a distributing valve chamber and a power cylinder axially aligned within said casing; a distributor valve and piston assembly comprising a distributor valve member adapted to move in said valve chamber, a motor piston movable in said power cylinder, and a piston rod rigidly connecting the two; means for admitting fluid under pressure to the outer end of the valve chamber and an outlet conduit leading from said valve chamber and controlled by the distributor valve member, the outer end of said power cylinder being closed; a throttled pressure fluid passageway passing longitudinally through said distributor valve member, said piston rod, and said piston to the power cylinder upon the outer side of the piston, the throttling means comprising a fluid pressure actuated valve; a by-pass passageway leading through the piston from one side to the other thereof; and a constriction in said by-pass passageway of selective graduated cross-section.

11. In a distributing device of the class described, a casing, a distributing valve chamber and a power cylinder axially aligned within said casing; a distributor valve and piston assembly comprising a distributor valve member adapted to move in said valve chamber, a motor piston movable in said power cylinder, and a piston rod rigidly connecting the two; means for admitting fluid under pressure to the outer end of the valve chamber and an outlet conduit leading from said valve chamber and controlled by the distributor valve member, the outer end of said power cylinder being closed; a throttled pressure fluid passageway passing longitudinally through said distributor valve member, said piston rod, and said piston to the power cylinder upon the outer side of the piston, the throttling means comprising an interchangeable jet plug in the piston passageway having a fine jet orifice therein of selective capacity; a by-pass passageway leading through the piston from one side to the other thereof, a fluid pressure operated valve controlling said passageway, and means for alternatively applying fluid pressure from the outer side of the piston to a surface of said valve and subjecting said surface to low pressure to actuate said by-pass valve.

12. In an automatic fluid distributing system, in combination, a source of fluid under pressure, a plurality of conduits leading to points of delivery of said fluid, and a distributing device for successively placing said conduits in communication with said source of supply, said device comprising a casing enclosing in axial alignment a valve chamber and a power cylinder, the cross-sectional area of the power cylinder being greater than that of the valve chamber, an inlet port for pressure fluid from said source at the end of said valve chamber remote from said power cylinder, said cylinder also having a longitudinal series of outlet ports communicating respectively with said conduits, a distributing valve member disposed for reciprocation in said valve chamber so as to successively provide communication between said inlet port and said outlet ports, an actuating piston disposed for reciprocation in said power cylinder, and a hollow piston rod rigidly connecting said valve member and said actuating piston to provide a unitary differential valve and piston assembly, means for maintaining the mutually inwardly directed faces of said valve member and said piston at all times during operation subject to pressure lower than that of the fluid from said source, means for applying fluid under pressure at all times during operation to the outward face of said valve member; a first passageway passing longitudinally through said valve member, said hollow piston rod, and into the interior of said piston; other passageways in said piston leading through the respective faces thereof through which said pressure fluid may be passed to determine the preponderance of pressure on one side or the other of said assembly to effect its movement in either direction, a valve in certain of said passageways to control the passage of fluid therethrough, a duct supplying pressure fluid to a surface of said valve to actuate it, said other passageways including a second passageway leading to the outward face of the piston, a third passageway leading to the inward low pressure side of the piston, a control valve adapted when in one end position to open both said duct and said second passageway to the first named pressure fluid supplying passageway, and when in the other end position to interrupt communication between said duct and said first and second passageways and open communication between said duct and said third or low pressure passageway, and a bleed passageway by-passing said control valve when in the second named position to provide limited communication between said first and second passageways.

13. For use in an automatic fluid distributing system, which includes a source of fluid under pressure and a plurality of conduits leading to points of delivery of said fluid; a distributing device for successively placing said conduits in communication with said source of supply, said device comprising a casing enclosing in axial alignment a valve chamber and a power cylinder, the cross-sectional area of the power cylinder being greater than that of the valve chamber, an inlet port for pressure fluid from said source at the end of said valve chamber remote from said power cylinder, said cylinder also having a longitudinal series of outlet ports communicating respectively with said conduits, a distributing valve member disposed for reciprocation in said valve chamber so as to successively provide communication between said inlet port and said outlet ports, an actuating piston disposed for axial reciprocation in said power cylinder, and a piston rod rigidly connecting said valve member and said actuating piston to provide a unitary differential valve and piston assembly, means for maintaining the mutually inwardly directed faces of said valve member and said piston at all times during operation subject to pressure lower than that of the fluid from said source, means for applying fluid under pressure at all times during operation to the outward face of said valve member, and means for directing fluid under pressure to the outward face of said piston in the power cylinder to normally exert a preponderance of pressure upon the differential valve and piston assembly to move it in a direction toward the valve chamber end of the casing, passageways passing serially through said piston through which fluid may be passed to determine the preponderance of pressure on one side or the other of said assembly to effect its movement in either direction, one of said passageways of the series having a differential diameter providing a shoulder against which an axially reciprocating valve member may abut, a floating valve member disposed for axially reciprocating movement within said last named passageway for controlling the passage of fluid axially into said passageway from the smaller diameter end of said passageway toward the larger diameter portion thereof, said valve member adapted to have one face abut said shoulder, said face being subject to pressure from one side of said piston at all times, radial passageways leading from said portion of larger diameter to debouch upon the opposite side of said piston, means for selectively applying fluid pressure axially to one face of said valve member opposite to the face which abuts said shoulder, for actuating said valve in accordance with the desired alternate movement of the assembly in opposite directions to cyclically distribute fluid through the delivery conduits.

14. The distributing device as set forth in claim 13 in which said last named means comprises a reversing valve controlling a passageway leading through a portion of said piston to said opposite face of said valve member to place said face in communication with high and low pressure zones of the power cylinder.

15. The distributing device set forth in claim 14 in which the reversing valve is a fluid counter-balanced valve plunger, and actuating means for said plunger are carried by the assembly and are adapted to be tripped near the ends of the respective movements in each direction by contact with a part fixed with respect to the casing.

16. A valve tripping trigger device for controlling an oppositely reciprocating valve controlling flow through passageways in a piston, said piston having a piston rod fixed thereto; said trigger device comprising an element carried by said piston rod for relative lost motion upon each reciprocation of the rod, means maintaining said element at a uniform slight distance from said rod and parallel thereto, a toroidal shaped rubber ring surrounding said piston rod and in frictional contact at a portion of its periphery with said element, whereby proper relative movement between said element and said piston rod upon occurrence of the tripping action is permitted, but adversely relative movement or creeping is prevented.

17. In a cyclical automatic fluid distributing system for fluid under pressure including a reciprocatable differential piston having two spaced heads of differing diameter, means for directing said fluid against two opposite sides of the heads of said piston to create an unbalance of pressure to move said piston in one direction and means on the larger of said heads for automatically venting to the other side thereof the pressure acting against said first side during one portion of the cycle to create an unbalance of pressure moving the piston in the other direction and for preventing such venting during the remainder of the cycle to cause said piston to move in said first mentioned direction, said means comprising a series of passageways in said piston head and opening at one end in the side against which pressure is directed, one of said passageways having an enlarged portion therein forming a valve seat, a floating valve member disposed for axial reciprocation within said enlarged portion and adapted to contact said seat to prevent the flow of fluid from the pressure side of said head into said enlarged portion, a venting passageway communicating between said enlarged portion and the other side of said head, said passageway being closed when said valve member is in contact with said seat, and means for alternatively placing the other end of said series of passageways in communication with the two sides of said piston head, said valve member being urged into contact with said seat when communication is with the pressure side and being unseated when communication is with said other side by virtue of the pressure on said pressure side.

18. The system as in claim 17 including spring means biasing said valve member into contact with said seat but adapted to be overcome by the pressure from the pressure side of said head.

19. The system as in claim 17 wherein said valve member is a differential piston, the diameters of the differential faces thereof being so selected as to maintain the member in its closed position when the faces thereof are acted upon by fluid from said pressure side of said head.

20. The system as in claim 17 wherein the means for alternatively placing said other end in communication with the two sides of said piston head comprises a chamber into which said other end opens, spaced ports in said chamber, one leading to one face of said head and another leading to the other face of said head, and a control member movable in said chamber to close one or the other of said ports.

References Cited in the file of this patent

UNITED STATES PATENTS

| | | |
|---|---|---|
| 897,346 | Breitenstein | Sept. 1, 1908 |
| 1,031,340 | Howard | July 2, 1912 |
| 2,059,126 | Malthaner | Oct. 27, 1936 |
| 2,323,839 | Nixon | July 6, 1943 |
| 2,539,241 | Forsmark | Jan. 23, 1951 |